J. MOSOVSKÝ.
BAKER'S IMPLEMENT.
APPLICATION FILED APR. 10, 1920.

1,362,174.

Patented Dec. 14, 1920.

INVENTOR
Joseph Mosovsky
BY
Edmond Livingston Brown
ATTORNEY

UNITED STATES PATENT OFFICE.

JOSEPH MOSŎVSKÝ, OF NEW YORK, N. Y.

BAKER'S IMPLEMENT.

1,362,174.   Specification of Letters Patent.   Patented Dec. 14, 1920.

Application filed April 10, 1920. Serial No. 372,894.

*To all whom it may concern:*

Be it known that I, JOSEPH MOSŎVSKÝ, a citizen of the United States, and a resident of the borough of Manhattan, in the city, county, and State of New York, have invented certain new and useful Improvements in Bakers' Implements, of which the following is a specification.

My invention relates to bakers' implements, and has for one of its principal objects to provide means for expediting the preparation of dough for baking, and more particularly for expeditiously cutting into small equal parts thin sheets of dough, said means being adapted to operate satisfactorily in spite of unevenness in the surface on which the dough is spread.

The invention consists in the novel construction, arrangement and combination of elements and parts, as shown in the accompanying drawings and fully described in this specification.

Figure 1:
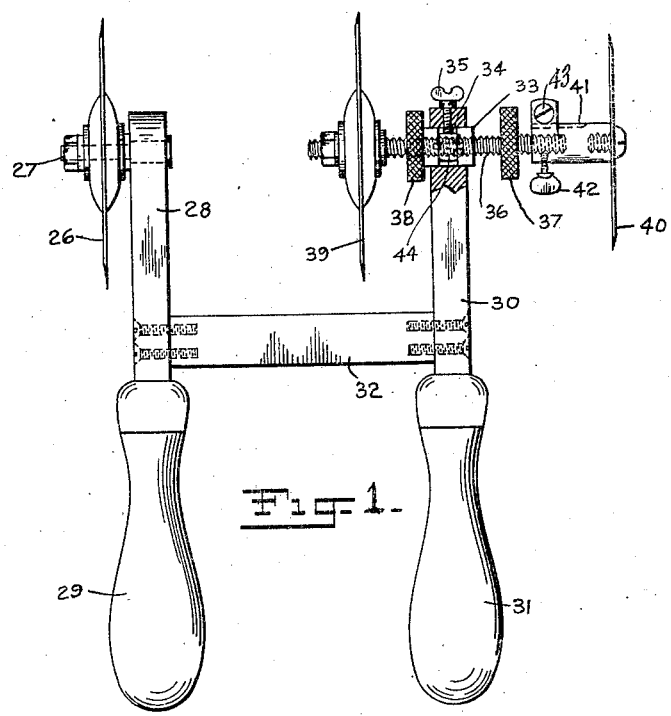
Figure 2:
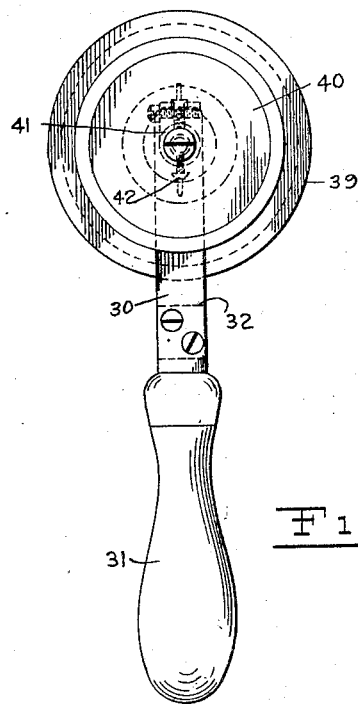

In the said drawings, Figure 1 is a plan view of my invention; and Fig. 2 is an end view thereof, as seen from the right of Fig. 1.

In carrying my invention into effect in the embodiment thereof which I have selected for illustration in the accompanying drawings and description in this specification, I provide a rotary knife 26. This knife 26 is mounted on a spindle 27, which is journaled in one end of a bar 28, the other end of which bar carries a handle 29. A similar bar 30, provided with a handle 31, is permanently and rigidly secured to the bar 26 by means of a bar 32.

A threaded bushing 33 is mounted in the end of the bar 30. This threaded bushing 33 is provided with an internal screw thread, and also with an annular external recess, as shown at 34, with which a set screw 35 on the bar 30 is adapted to engage, for the purpose of retaining the bushing 33 rotatably in place when the knife 39 is adjusted. A screw 44 is adapted when tightened to secure the bushing 33 to a threaded bolt 36. This threaded bolt 36 passes through the threaded bushing 33 and engages with the internal screw thread thereof. Knurled nuts 37 and 38 serve to secure the bolt 36 in any desired position. On the inner end of the bolt 36 is mounted a circular knife 39 similar to the knife 26.

On the outer end of the bolt 33 is mounted a guide or marking wheel 40, of smaller diameter than the knives 26 and 39. This guide wheel 40 is secured on a block 41, movable longitudinally on the bolt 36 and securable thereto by means of a screw 42. The block 41 is also provided with a slot to enable it to be tightened over worn out screw thread, which adjustment is secured by means of a clamp screw 43.

In the operation of this embodiment of my invention, the bolt 36 is manipulated so that the knives 26 and 39 are the desired distance apart, and the guide or marking wheel 40 is adjusted so that its distance from the knife 39 shall be equal to the distance between the two knives. The dough is spread upon a board, preferably in long, parallel strips, and the device rolled over the board, being operated by the handles 29 and 31. The knives 26 and 39 operate simultaneously, and cut the strips of dough into equal parts suitable for baking into rolls, in a manner which will be readily understood. The guide 40 runs over one of the cuts previously made, and insures a uniform distance between all cuts. By limiting the number of knives to two, and by making the guide or marking wheel 40 of smaller diameter than the knives 26 and 39, I insure against any imperfect cuts resulting from inequalities in the surface of the doughboard.

The advantages of my invention will be obvious from what has been above set forth concerning its construction and mode of operation.

Having thus described my invention, what I claim as new and desire to secure by Letters Patent is as follows:

1. In a cutting utensil, the combination with a handle; of a cutting member mounted on said handle, a second cutting member mounted on said handle, means adapted to adjust the distance between said cutting members, a guide member mounted on said handle, said guide member being of smaller size than said cutting members, and means adapted to adjust the distance between said guide member and one of said cutting members.

2. In a cutting utensil, the combination with a handle; of a cutting member mounted on said handle, a member mounted on said handle and provided with an internal screw thread, a bolt having a screw thread adapted to engage with said first named screw thread, a cutting member mounted on said bolt, and a guide member of smaller size than said cutting member adjustably mounted on said bolt.

In witness whereof I have hereunto signed my name this 23 day of Feb., 1920, in the presence of two subscribing witnesses.

JOSEPH MOSOVSKÝ.

Witnesses:
FRANK BARTCH,
JOSEPH KOJSECKÝ.